US012755868B2

(12) United States Patent
Elliott et al.

(10) Patent No.: US 12,755,868 B2
(45) Date of Patent: Oct. 6, 2026

(54) LOW COST SCALABLE MICRO COAXIAL INTERCONNECT

(71) Applicant: Raytheon Company, Tewksbury, MA (US)

(72) Inventors: James M. Elliott, Allen, TX (US); Clint B. Sawyer, Mckinney, TX (US)

(73) Assignee: RAYTHEON COMPANY, Arlington, VA (US)

(*) Notice: Subject to any disclaimer, the term of this patent is extended or adjusted under 35 U.S.C. 154(b) by 355 days.

(21) Appl. No.: 18/621,884

(22) Filed: Mar. 29, 2024

(65) Prior Publication Data

US 2025/0308726 A1 Oct. 2, 2025

(51) Int. Cl.

| | |
|---|---|
| ***H01B 11/18*** | (2006.01) |
| ***H01B 11/20*** | (2006.01) |
| ***H01B 13/00*** | (2006.01) |
| ***H01B 13/016*** | (2006.01) |

(52) U.S. Cl.

CPC ......... *H01B 11/1808* (2013.01); *H01B 11/20* (2013.01); *H01B 13/003* (2013.01); *H01B 13/0036* (2013.01); *H01B 13/016* (2013.01); *H01B 11/1895* (2013.01)

(58) Field of Classification Search

CPC . H01B 11/1808; H01B 11/20; H01B 11/1895; H01B 13/003; H01B 13/0036; H01B 13/016

USPC .......................................................... 439/675

See application file for complete search history.

(56) References Cited

U.S. PATENT DOCUMENTS

| | | | | |
|---|---|---|---|---|
| 6,239,385 B1 * | 5/2001 | Schwiebert | H05K 1/025 | 439/63 |
| 7,247,030 B2 * | 7/2007 | Hilty | H01R 9/2658 | 439/607.05 |
| 8,480,409 B2 * | 7/2013 | Paine | H01R 12/727 | 439/63 |
| 8,549,730 B2 * | 10/2013 | Nakanishi | H01R 24/52 | 29/599 |
| 2005/0221634 A1 * | 10/2005 | Hilty | H01R 9/2658 | 439/70 |
| 2007/0051080 A1 | 3/2007 | Crockett et al. | | |
| 2008/0296351 A1 | 12/2008 | Crockett et al. | | |
| 2016/0118737 A1 * | 4/2016 | Beroz | H05K 7/10 | 439/656 |
| 2018/0249896 A1 * | 9/2018 | Mikami | A61B 1/044 | |

* cited by examiner

*Primary Examiner* — Gary F Paumen

(74) *Attorney, Agent, or Firm* — CANTOR COLBURN LLP

(57) ABSTRACT

A method of manufacturing one or more coaxial assemblies includes forming a first panel member and a second panel member by diffusion bonding sheets formed of a metal material, disposing one or more conductive elements between the first panel member and the second panel member at locations corresponding to the one or more coaxial assemblies, bonding the first panel member to the second panel member to form an assembly structure including a plurality of coaxial assemblies, and separating the one or more coaxial assemblies from the assembly structure. The bonding includes disposing a conductive epoxy, a conductive solder, or a layer formed of the conductive epoxy or the conductive solder and between the first panel member and the second panel member.

20 Claims, 18 Drawing Sheets

1400

LOW COST SCALABLE MICRO COAXIAL INTERCONNECT

BACKGROUND

The present disclosure relates to coaxial interconnects and, in particular, to low cost, scalable micro coaxial interconnects.

BRIEF DESCRIPTION

According to an aspect of the disclosure, a method of manufacturing one or more coaxial assemblies is provided, the method including: forming a first panel member by diffusion bonding a first sheet formed of a metal material to a second sheet formed of the metal material; forming a second panel member by diffusion bonding a third sheet formed of the metal material to a fourth sheet formed of the metal material; disposing one or more conductive elements between the first panel member and the second panel member at locations corresponding to the one or more coaxial assemblies, wherein the one or more conductive elements extend in a longitudinal direction of the one or more coaxial assemblies; bonding the first panel member to the second panel member to form an assembly structure including a plurality of coaxial assemblies, wherein the bonding includes disposing a conductive epoxy or a conductive solder between the first panel member and the second panel member; and separating the one or more coaxial assemblies from the assembly structure.

In any one or combination of the embodiments disclosed herein, the method further includes: pattern etching or machining one or more first features into the first sheet, the second sheet, or both; and pattern etching or machining one or more second features into the third sheet, the fourth sheet, or both, wherein the one or more first features, the one or more second features, or both correspond to a shape of the one or more conductive elements.

In any one or combination of the embodiments disclosed herein, the manufacturing of the one or more coaxial assemblies is absent user intervention.

In any one or combination of the embodiments disclosed herein, the method further includes: laser cutting a plurality of sheets formed of the metal material, the plurality of sheets including at least the first sheet through the fourth sheet, wherein the laser cutting is prior to the diffusion bonding of the first sheet to the second sheet, the diffusion bonding of the third sheet to the fourth sheet, or both.

In any one or combination of the embodiments disclosed herein, the method further includes: wire electrical discharge machining a plurality of sheets formed of the metal material, the plurality of sheets including at least the first sheet through the fourth sheet, wherein the electrical discharge machining is prior to the diffusion bonding of the first sheet to the second sheet, the diffusion bonding of the third sheet to the fourth sheet, or both.

In any one or combination of the embodiments disclosed herein, the method further includes: water jet fabricating a plurality of sheets formed of the metal material, the plurality of sheets including at least the first sheet through the fourth sheet, wherein the water jet fabricating is prior to the diffusion bonding of the first sheet to the second sheet, the diffusion bonding of the third sheet to the fourth sheet, or both.

According to an aspect of the disclosure, an assembly is provided including: a plurality of layers disposed in a stacked arrangement; and one or more conductive elements disposed between adjacent layers of the plurality of layers, wherein the one or more conductive elements extend in a longitudinal direction of the assembly, wherein: each layer includes two or more diffusion bonded metal layers; and each layer includes one or more patterns corresponding to the one or more conductive elements and formed using a chemical etching process.

In any one or combination of the embodiments disclosed herein, the assembly further includes: a conductive epoxy layer disposed between and bonding the adjacent layers of the plurality of layers.

In any one or combination of the embodiments disclosed herein, the adjacent layers are diffusion bonded adjacent layers.

In any one or combination of the embodiments disclosed herein, each layer of the plurality of layers includes a set of pins, wherein: one or more first pins of the set of pins are formed at a first end of the layer; and one or more second pins of the set of pins are formed at a second end of the layer.

In any one or combination of the embodiments disclosed herein, each layer of the plurality of layers includes: a first quadrangular member; a second quadrangular member; and one or more elongated members between the first quadrangular member and the second quadrangular member.

In any one or combination of the embodiments disclosed herein: the one or more first pins are formed at a first end of the first quadrangular member; and the one or more second pins are formed at a first end of the second quadrangular member.

In any one or combination of the embodiments disclosed herein, each pin of the set of pins is of a substantially uniform thickness.

In any one or combination of the embodiments disclosed herein, each pin of the set of pins is tapered such that: a width of the one or more first pins decreases in a direction away from a center of the layer; and a width of the one or more second pins decreases in a direction away from the center of the layer.

In any one or combination of the embodiments disclosed herein: a first end of the one or more conductive elements protrudes outward in a first direction from a first end of the assembly; and a second end of the one or more conductive elements protrudes outward in a second direction opposite the first direction, from a second end of the assembly.

In any one or combination of the embodiments disclosed herein, the one or more conductive elements include one or more coaxial cables.

In any one or combination of the embodiments disclosed herein, the plurality of layers are each of a same thickness.

In any one or combination of the embodiments disclosed herein, the plurality of layers include: a first layer; a second layer adjacent to and disposed below the first layer; a third layer adjacent to and disposed below the second layer; and a plurality of fourth layers associated with meeting end item design specifications; and the one or more conductive elements include: one or more first conductive elements disposed between the first layer and the second layer; one or more second conductive elements disposed between the second layer and the third layer; and one or more third conductive elements disposed between adjacent fourth layers among the plurality of fourth layers.

In any one or combination of the embodiments disclosed herein, the plurality of layers include: a fifth layer disposed between the first layer and the second layer, wherein the fifth layer is disposed at a same level with respect to the one or more first conductive elements; a sixth layer disposed between the second layer and the third layer, wherein the sixth layer is disposed at a same level with respect to the one or more second conductive elements; and one or more seventh layers disposed at a same level with respect to the one or more third conductive elements.

In any one or combination of the embodiments disclosed herein, the two or more diffusion bonded metal layers each include stainless steel, a stainless steel alloy, or both.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method are presented herein by way of exemplification and not limitation with reference to the Figures.

Existing approaches for producing some coaxial interconnect assemblies (also referred to herein as coaxial assemblies) are associated with high manufacturing costs and long lead times associated with machining the coaxial interconnect assemblies. For example, in some cases, machined stainless steel precision parts are associated with high costs and may be difficult to produce.

Aspects of the present disclosure include techniques for manufacturing a coaxial assembly (or multiple coaxial assemblies) utilizing photo patterned (etched) thin, for example, stainless steel sheets that are stacked and diffusion bonded together to form sublayers. In some embodiments, the techniques described herein may include epoxy bonding the sublayers together with coaxial cables to form coaxial assemblies. The techniques described herein enable batch processing (in panel form) providing major cost and cycle time reduction, example aspects of which are later described herein.

Other methods of manufacturing some coaxial assemblies may include standard machining techniques which can be time and labor intensive and limited to producing parts one at a time. Though some techniques may incorporate methods of bonding at both the sublayer and final assembly levels such as, for example, diffusion bonding, epoxy bonding, welding, soldering, brazing, or the like), such other techniques have failed to reduce the amount of time and labor associated with producing parts.

The techniques described herein provide significant part cost reduction compared to traditional machining methods.

The techniques described herein may greatly reduce cycle times at a supplier and cycle times associated with next higher level assembly. For example, in some embodiments, the manufacturing techniques described herein may be implemented using automated equipment, which may reduce costs, lead times, and support improved manufacturing tolerances.

Figure 1A:
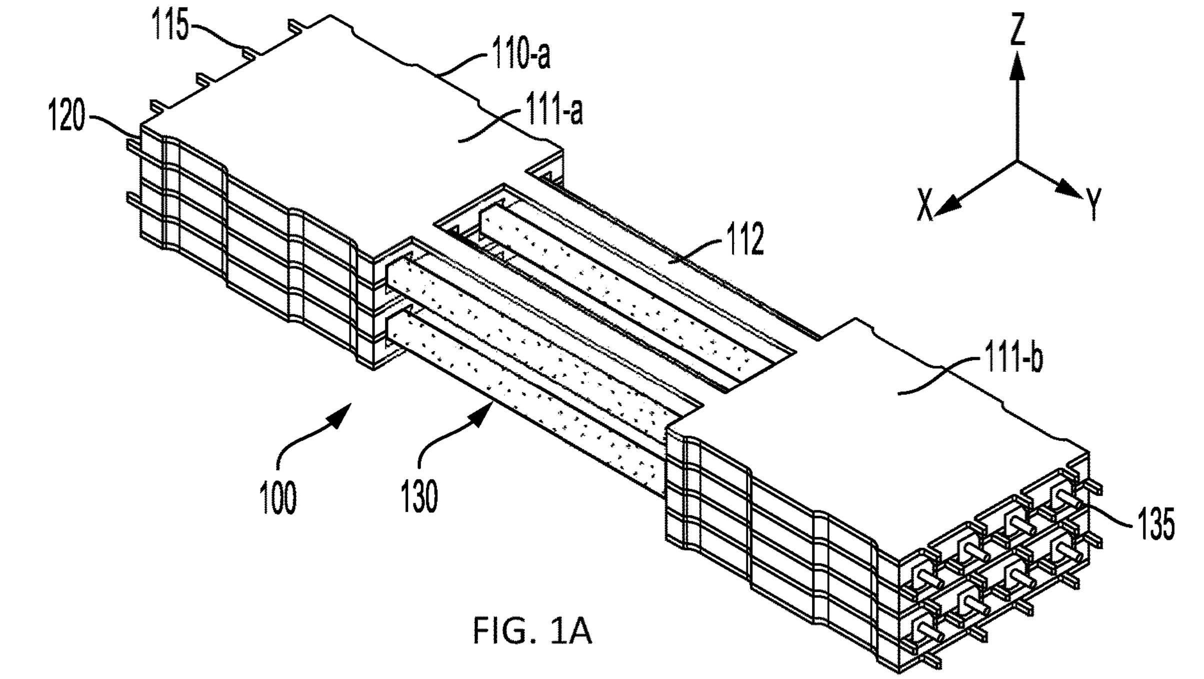
FIGS. 1A, FIG. 1B, and FIG. 1C illustrate example views of a coaxial assembly in accordance with one or more embodiments of the present disclosure.
Figure 1B:
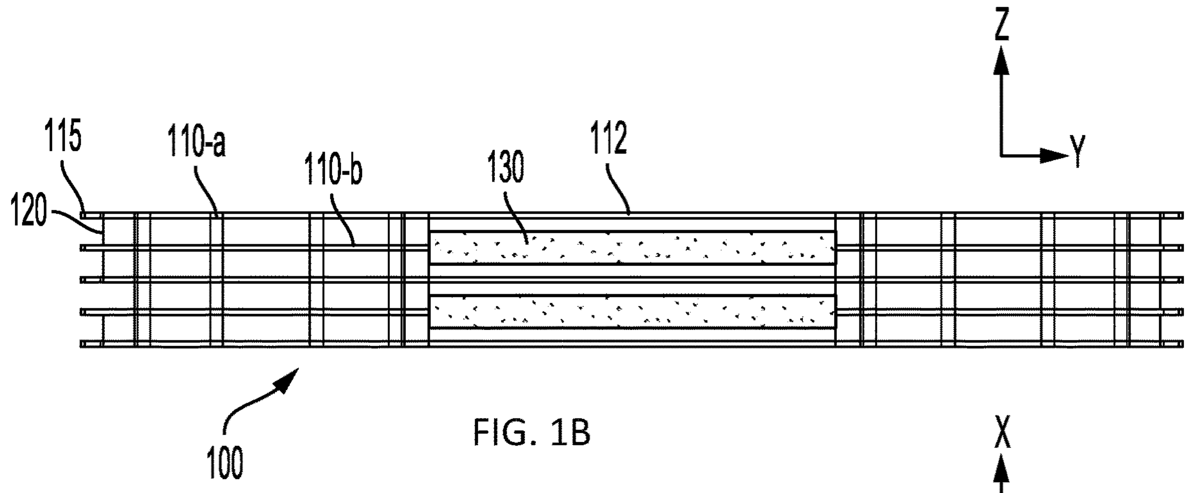
Figure 1C:
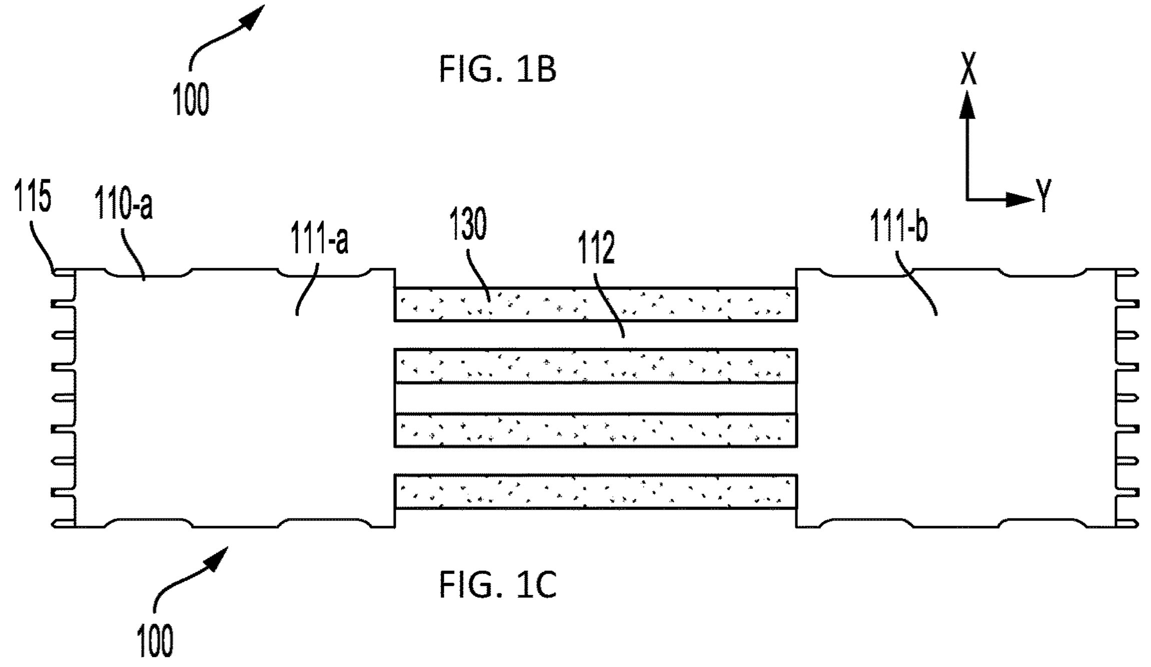

FIGS. 1A through 1C illustrate example views of a coaxial assembly 100 in accordance with one or more embodiments of the present disclosure. In the examples illustrated herein, the coaxial assembly 100 is a singulated 8-pin insert. However, embodiments supported by the present disclosure are not limited thereto, and the coaxial assembly 100 may include any quantity of components (e.g., pins, coaxial cables, and the like) supportive of functions of the coaxial assembly 100.

In an example, embodiments of the present disclosure include patterning thin sheets of stainless steel (2-8 mm thick). The sheets, in panel form, are then stacked and diffusion bonded together. Examples of the sheets in panel form are later described with reference to FIGS. 6 through 8.

Embodiments of the present disclosure include diffusion bonding to form the sheets into a solid structure (e.g., assembly structure 600) with no bondline variations associated with traditional bond materials (e.g., epoxy or solder), thereby providing excellent tolerance control. The diffusion bonding in accordance with example aspects of the present disclosure enables panelization, which greatly reduces part cost, reduces labor costs associated with next higher level assembly (e.g., by enabling automated assembly processing), and reduces associated cycle times.

Aspects of the present disclosure include forming assembly structures (e.g., assembly structure 600 later illustrated at FIG. 6) including multiple coaxial assemblies 100 using photo imaging processes and/or laser patterning processes. The techniques described herein include stacking and diffusion bonding layers (e.g., layers 110 described herein)

together to create a 3D structure equivalent to a machined baseline design. The techniques described herein support automated assembly of installing coaxial cables 130 to coaxial assemblies 100 of the assembly structures. In contrast, other solutions which include high cost machining to produce a coaxial assembly are not compatible with next higher level automated assembly.

The manufacturing techniques described herein may support applications requiring high density RF interconnects through a heat sink or vertical board to board connections. For example, the coaxial assembly 100 may carry RF signals through a thermal heatsink in a design that is greatly challenged by limited real estate to fit the connections within a small unit cell.

The manufacturing techniques described herein utilize precision photo patterned sheets diffusion bonded together to create a scalable 3D structure (e.g., assembly structure 600 later illustrated at FIG. 6) including multiple coaxial assemblies 100 compared to some other methods (e.g., machining, molding, and the like), thereby optimizing low cost, providing reduced manufacturing times (e.g., in view of short turnaround times), providing compatibility with automated assembly, and supporting optimized patternable shapes.

Figure 2:
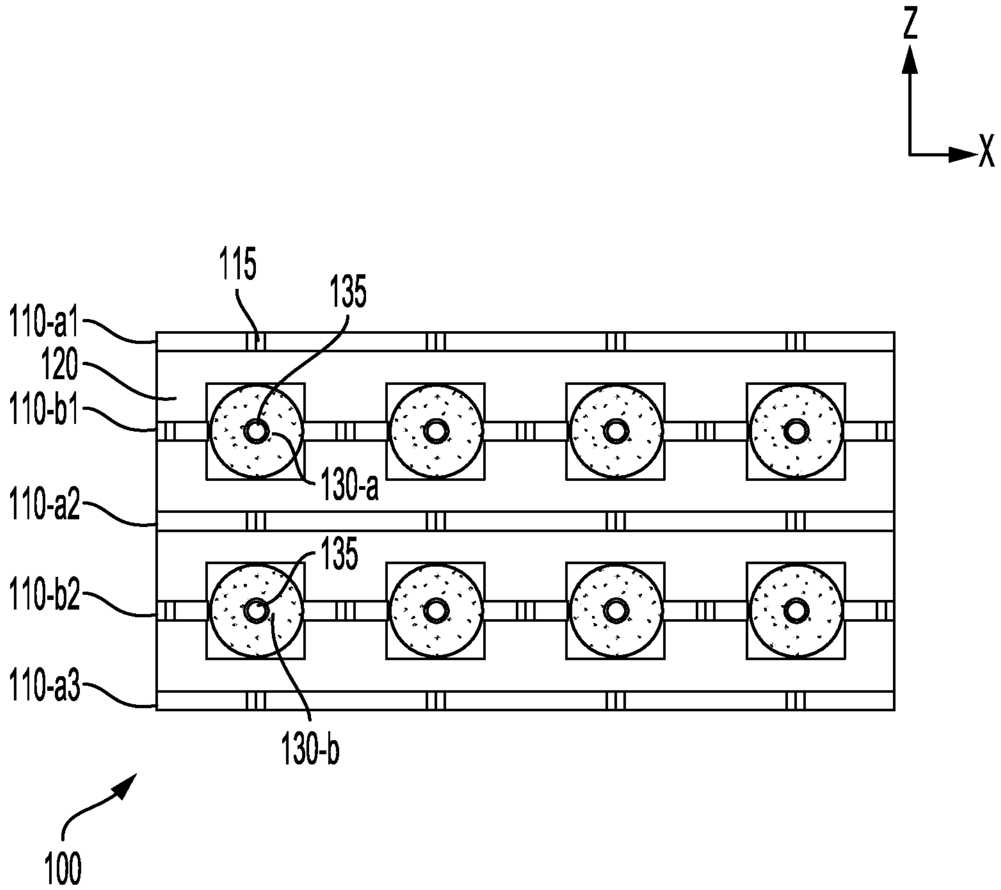
FIG. 2 illustrates another view of the coaxial assembly in accordance with one or more embodiments of the present disclosure.

FIG. 2 illustrates another view of the coaxial assembly 100 in accordance with one or more embodiments of the present disclosure. In the example illustrated at FIG. 2, layers 110 include layers 110-*a* (also referred to herein as diffusion bonded base layers) and layers 110-*b* (also referred to herein as diffusion bonded union layers). In some embodiments, each of the layers 110 is formed by diffusion bonding two or more metal layers (e.g., stainless steel, a stainless steel alloy). In some embodiments, one or more of the layers 110 may be formed by diffusion bonding more than two or more metal layers (e.g., three metal layers).

Embodiments of the present disclosure include further bonding the layers 110 through diffusion bonding. For example, the techniques described herein may include further bonding layers 110-*a* and layers 110-*b* through a conductive epoxy layer 120.

Additionally, or alternatively, (as later described with reference to FIG. 5), the techniques described herein may include bonding layers 110-*a* and layers 110-*b* through further diffusion bonding.

Figure 3:
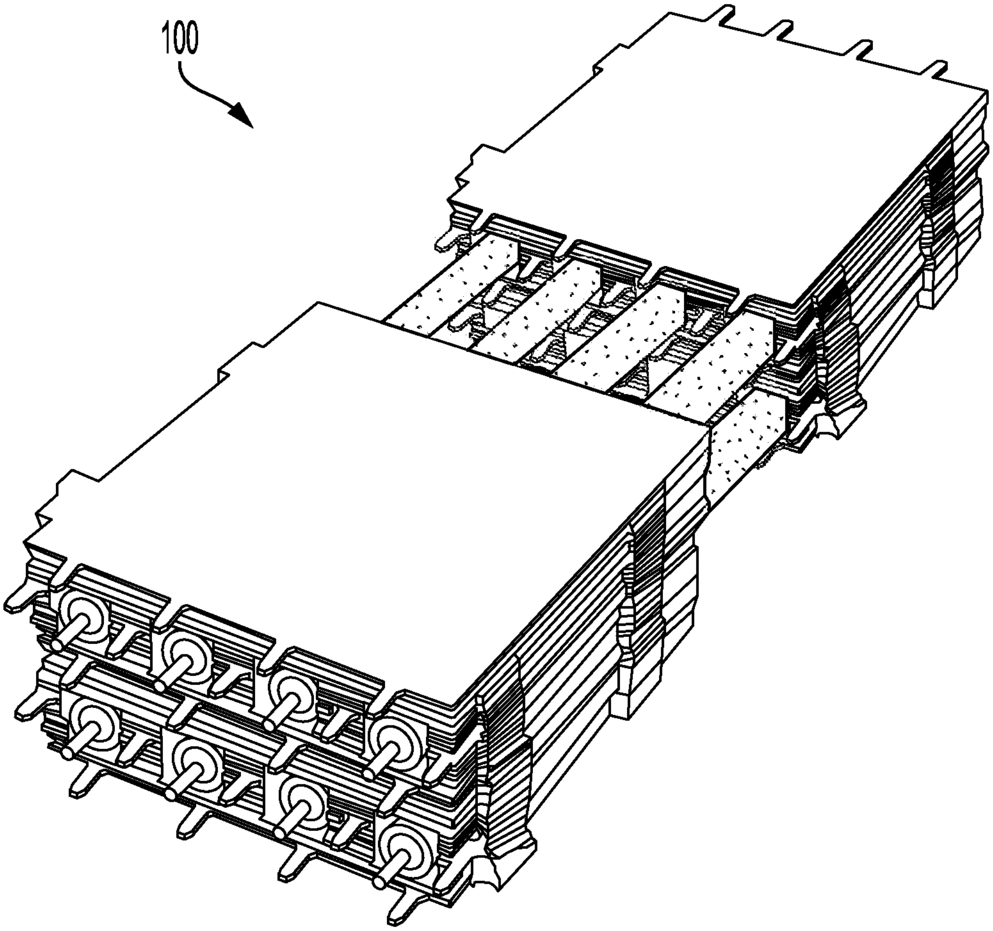
FIG. 3 illustrates an initial prototype coaxial assembly manufactured in accordance with one or more embodiments of the present disclosure.

FIG. 3 illustrates a coaxial assembly 100 manufactured in accordance with one or more embodiments of the present disclosure. As seen at FIG. 3, the coax cable assembly 100 manufactured in accordance with the example aspects of the present disclosure described herein includes multiple bonded patterned layers. In some cases, as illustrated at FIG. 3, the layer count may be detectable by inspecting the edges of the coaxial assembly 100.

According to one or more embodiments of the present disclosure, with reference to FIGS. 1-3, a coaxial assembly 100 is described including a plurality of layers 110 disposed in a stacked arrangement. The coaxial assembly 100 includes one or more conductive elements (e.g., coaxial cables 130) disposed between adjacent layers 110 (e.g., layer 110-*a* and a layer 110-*b*). The one or more conductive elements extend in a longitudinal direction of the coaxial assembly 100.

In some examples, the one or more conductive elements include a plurality of conductive elements. In some other examples, the one or more conductive elements include a single conductive element. That is, embodiments of the coaxial assembly 100 support any suitable quantity or arrangement of conductive elements.

In some embodiments, each layer 110 is formed by diffusion bonding two or more metal layers. The two or more metal layers may each include stainless steel, a stainless steel alloy, both, or the like. That is, for example, each layer 10 includes two or more diffusion bonded metal layers, and the two or more diffusion bonded metal layers may each include stainless steel, a stainless steel alloy, both, or the like.

In some cases, each layer 110 is formed by diffusion bonding three or more metal layers. In some embodiments, each layer 110 includes one or more patterns formed using a chemical etching process. That is, for example, each layer 110 includes one or more patterns corresponding to the one or more conductive elements and formed using a chemical etching process.

In some embodiments, the coaxial assembly 100 may include a conductive epoxy layer 120 disposed between and bonding adjacent layers 110 (e.g., layer 110-*a* and a layer 110-*b*) of the plurality of layers 110, and the coaxial assembly 100 is formed by bonding the adjacent layers 110 using the conductive epoxy layer 120.

In some alternative and/or additional embodiments, the coaxial assembly 100 is formed by diffusion bonding the adjacent layers 110. That is, for example, two or more adjacent layers 110 included in the assembly may be diffusion bonded adjacent layers 110.

In some aspects, each layer 110 (e.g., layer 110-*a*, layer 110-*b*) of the plurality of layers 110 may include a set of pins 115. In an example, one or more first pins 115 of the set of pins 115 are formed at a first end of the layer 110, and one or more second pins 115 of the set of pins 115 are formed at a second end (opposite the first end) of the layer 110.

In some aspects, each layer 110 of the plurality of layers 110 includes a first quadrangular member 111 (e.g., quadrangular member 111-*a*), a second quadrangular member 111 (e.g., quadrangular member 111-*b*), and one or more elongated members 112 between the first quadrangular member 111 and the second quadrangular member 111. In some aspects each quadrangular member 111 may include one or more portions which recess inward toward a center of the quadrangular member 111.

In some aspects, the one or more first pins 115 are formed at a first end of the first quadrangular member 111. In some aspects, the one or more second pins 115 are formed at a first end of the second quadrangular member 111. In some aspects, each pin 115 of the set of pins 115 is of a substantially uniform thickness. In some aspects, each pin 115 of the set of pins 115 is tapered. For example, a width of the one or more first pins 115 decreases in a direction away from a center of the layer and a width of the one or more second pins 115 decreases in a direction away from the center of the layer.

In some aspects, a first end of the one or more conductive elements protrudes outward in a first direction from a first end of the coaxial assembly 100. In some aspects, a second end of the one or more conductive elements protrudes outward in a second direction opposite the first direction, from a second end of the coaxial assembly 100.

In some embodiments, the plurality of layers 110 are each of a same thickness. For example, the respective thicknesses of layers 110-*a* may be equal to one another, and the respective thicknesses of layers 110-*b* may be equal to one another. In some cases, the respective thicknesses of layers 110-*a* may be equal to the respective thicknesses of layers 110-*b*. In some alternative and/or additional embodiments, one or more layers 110 may be of a different thickness than other layers 110 included in the plurality of layers 110.

With reference at least to FIGS. 1-3, the plurality of layers 110 may include a first layer 110 (e.g., layer 110-*a*1), a second layer 110 (e.g., layer 110-*a*2) adjacent to and disposed below the first layer 110, and a third layer 110 (e.g., layer 110-*a*3) adjacent to and disposed below the second layer 110. Though not illustrated, the plurality of layers 110 may include one or more fourth layers associated with meeting end item design specifications (e.g., a plurality of additional layers to meet end item design requirements). The one or more conductive elements may include one or more first conductive elements (e.g., coaxial cables 135-*a*) disposed between the first layer 110 and the second layer 110. The one or more conductive elements may include one or more second conductive elements (e.g., coaxial cables 135-*b*) disposed between the second layer 110 and the third layer 110. Though not illustrated, the one or more conductive elements may include one or more third conductive elements disposed between adjacent fourth layers among the plurality of fourth layers (e.g., a plurality of additional conductive elements disposed between the plurality of additional layers associated with meeting end item design requirements). For example, the one or more conductive elements may include a plurality of third conductive elements respectively disposed between adjacent fourth layers among the plurality of fourth layers.

The plurality of layers 110 may include a fifth layer 110 (e.g., 110-*b*1) disposed between the first layer 110 and the second layer 110, where the fifth layer 110 is disposed at a same level with respect to the one or more first conductive elements. The plurality of layers 110 may include a sixth layer 110 (e.g., 110-*b*2) disposed between the second layer 110 and the third layer 110, where the sixth layer 110 is disposed at a same level with respect to the one or more second conductive elements. Though not illustrated, the plurality of layers 110 may include a one or more seventh layers disposed at a same level with respect to the one or more third conductive elements (e.g., a plurality of layers disposed at the same level with respect to the plurality of additional conductive elements). For example, the plurality of layers 110 may include a plurality of seventh layers disposed at a same level with respect to the one or more third conductive elements.

Figure 4:
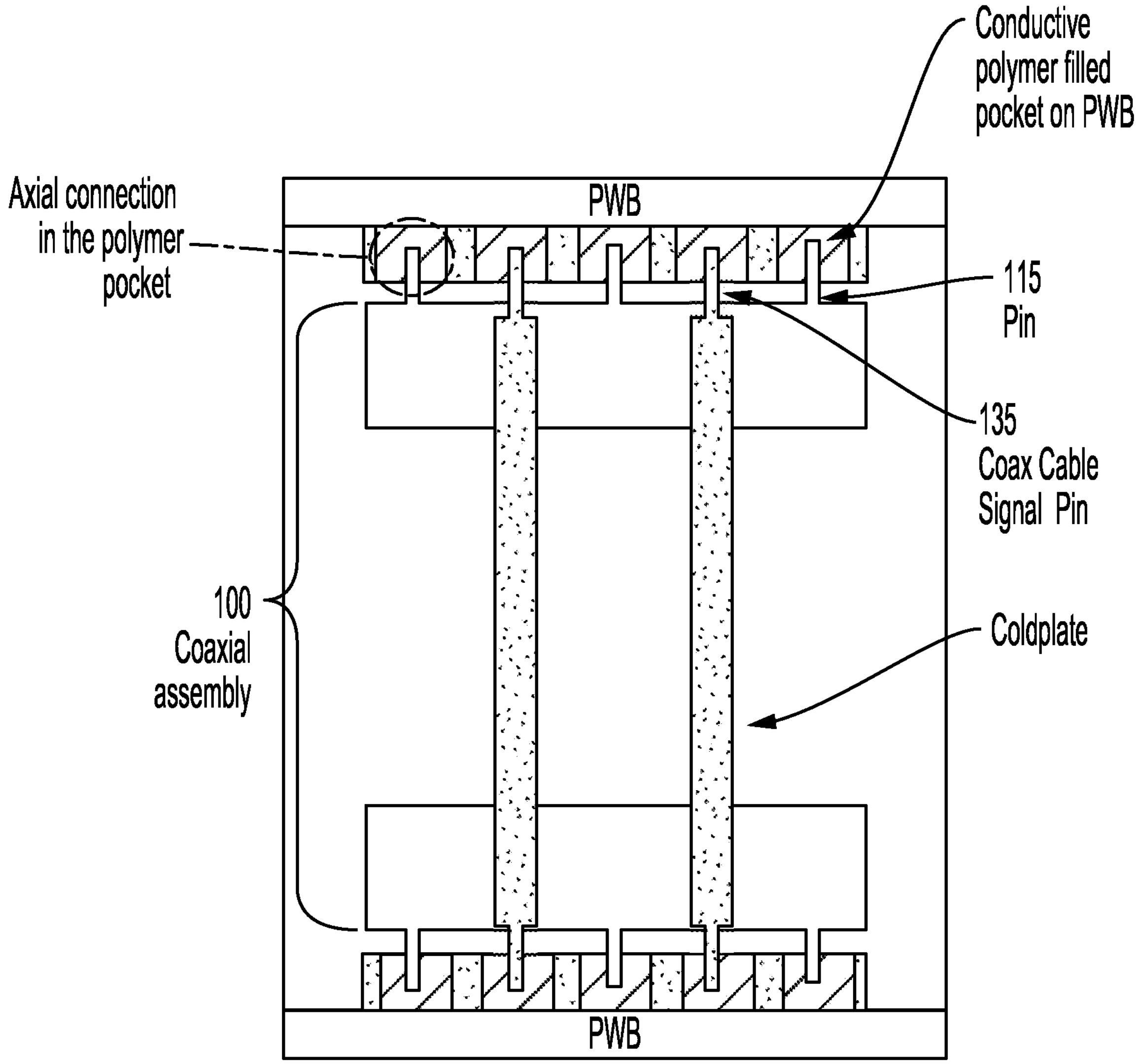
FIG. 4 illustrates aspects of the coaxial assembly implemented in conjunction with pin-in-pocket technology.

FIG. 4 illustrates aspects of the coaxial assembly 100 implemented in conjunction with pin-in-pocket technology. For example, aspects of the coaxial assembly 100 may be implemented in combination with the pin-in-pocket interconnect solution which may be the same as or similar to the type described in U.S. Pat. No. 9,923,293 entitled "Radially Compliant, Axially Free-Running Connector," assigned to the assignee of the present invention and hereby incorporated herein by reference in its entirety. Aspects of the coaxial assembly 100 support unit cell compaction which enables higher frequency panel architectures.

With reference to FIG. 4, two horizontal conductive compliant assemblies (CCAs) with an array of conductive polymer filled pockets that connect to a printed wiring board (PWB) pad at the bottom of a pocket are illustrated. The pins 115 of the coaxial assembly 100 described herein (low cost coax assembly) may penetrate the polymer and make a connection through the polymer to the pads on the PWB.

Figure 5:
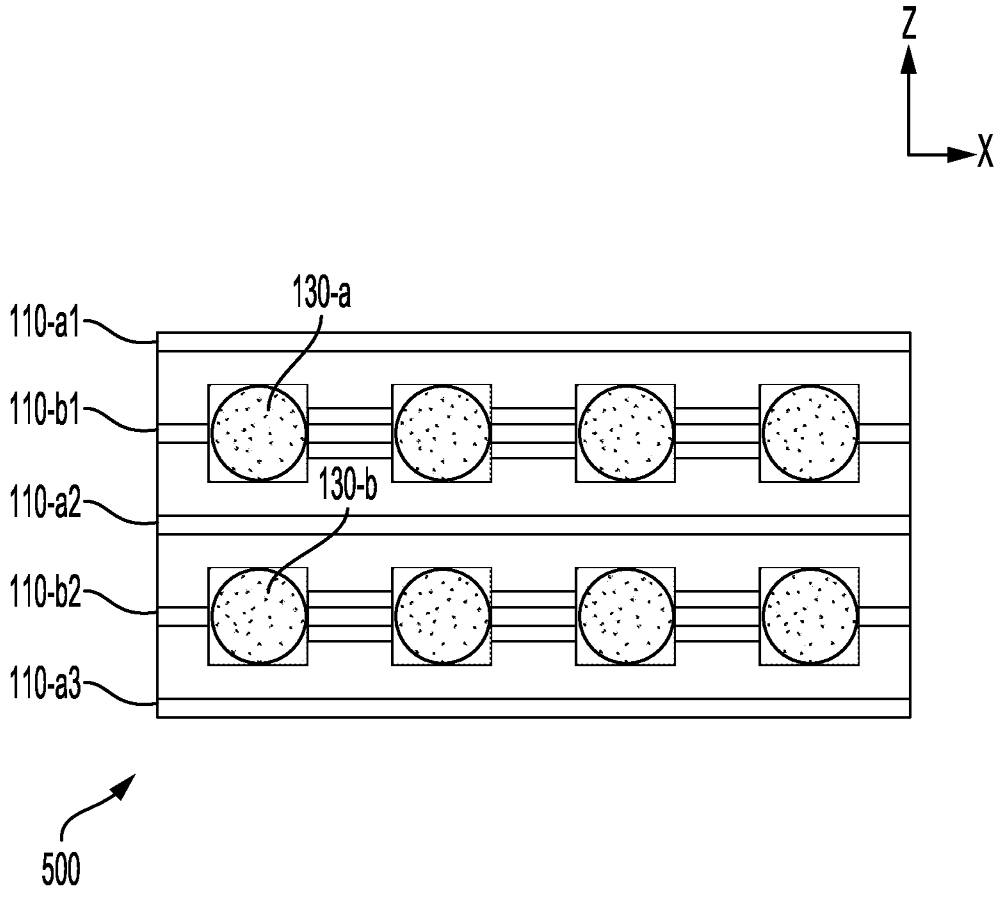
FIG. 5 illustrates a view of a coaxial assembly in accordance with one or more embodiments of the present disclosure.

FIG. 5 illustrates a view of a coaxial assembly 500 in accordance with one or more embodiments of the present disclosure. The view includes aspects of the coaxial assembly 100 described herein, and repeated descriptions of like elements are omitted for brevity.

With reference to FIG. 5, the techniques described herein may include bonding layers 110-*a* and layers 110-*b* through further diffusion bonding, without using a conductive epoxy layer 120. In the example of FIG. 5, the techniques described herein may include automated and/or manual insertion of the coaxial cables 130 and automated and/or manual application of epoxy in association with securing the cables in the coaxial assembly 500.

Figure 6:
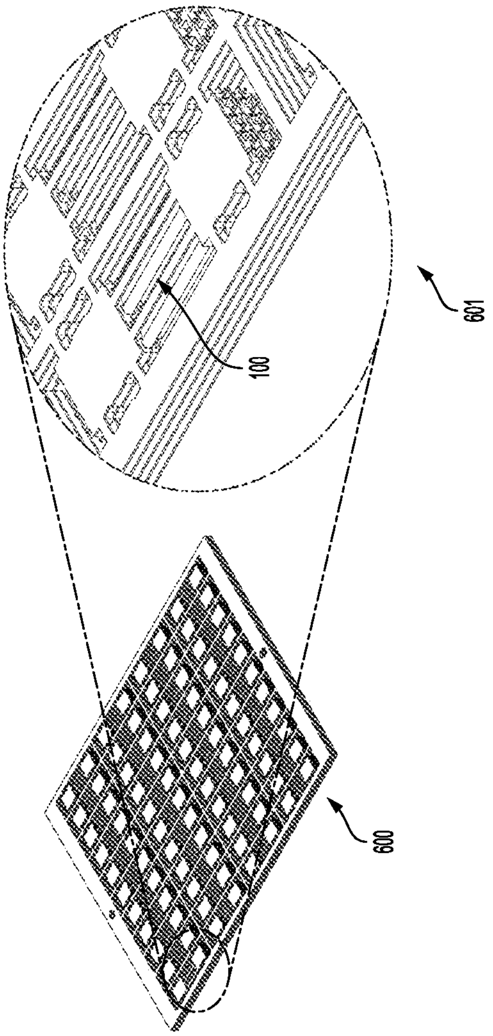
FIG. 6 illustrates an example of coaxial assembly in panel form prior to singulation, in accordance with one or more embodiments of the present disclosure.

FIG. 6 illustrates an assembly structure 600 manufactured in accordance with one or more embodiments of the present disclosure. FIG. 6 illustrates an enlarged view 601 of a portion of the assembly structure 600. The assembly structure 600 includes a plurality of coaxial assemblies 100. In accordance with example aspects of the present disclosure, the assembly structure 600 is scalable to include any quantity of coaxial assemblies 100. Each coaxial assembly 100 is scalable to include any suitable quantity of coaxial cables 130 and layers 110 supportive of features of the coaxial assembly 100.

Figure 7:
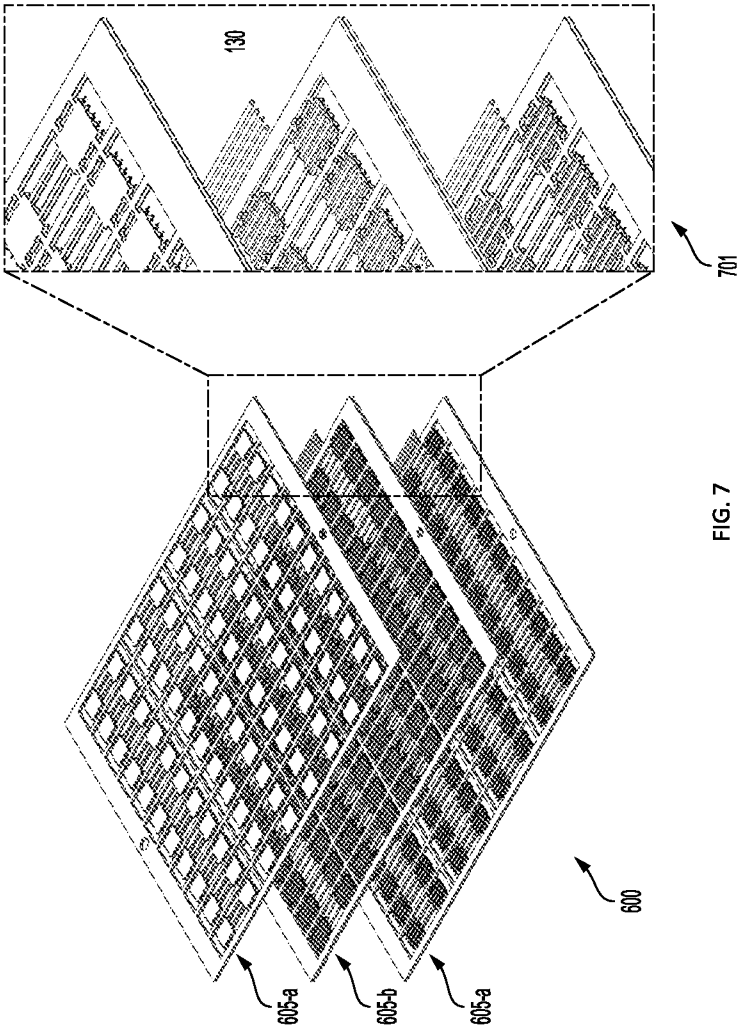
FIG. 7 illustrates an exploded view of the assembly structure of FIG. 6.

FIG. 7 illustrates an exploded view of the assembly structure 600 of FIG. 6. FIG. 7 illustrates an enlarged view 701 of a portion of the exploded view of the assembly structure 700. As illustrated at FIG. 7, the assembly structure 600 includes multiple panel members 605 (e.g., panel members 605-*a* and panel member 605-*b*). Embodiments of the present disclosure are not limited thereto, and the assembly structure 600 may include a different quantity of panel members 605 compared to the example illustrated at FIG. 7.

Figure 8A:
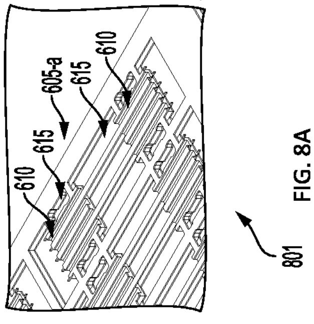
FIGS. 8A through 8E illustrate aspects of the manufacturing sequence of a coaxial assembly in accordance with one or more embodiments of the present disclosure.
Figure 8B:
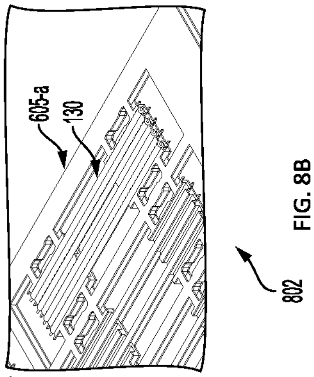
Figure 8C:
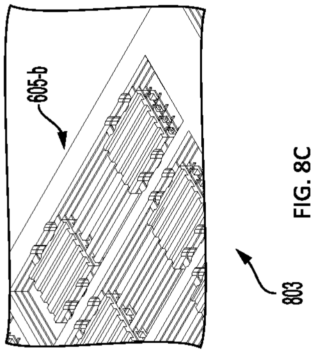
Figure 8D:
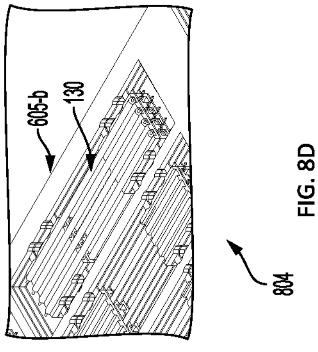
Figure 8E:
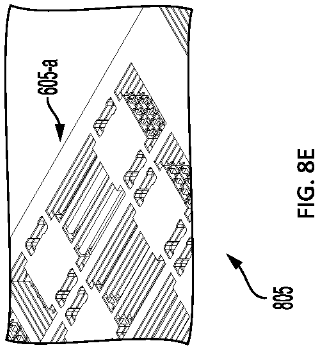
Figure 8F:
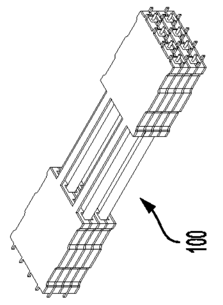
FIG. 8F illustrates an example of the manufactured coaxial assembly.

FIGS. 8A through 8E include views 801 through 805 illustrative of example operations associated with manufacturing a coaxial assembly 100 illustrated at FIG. 8F, in accordance with one or more embodiments of the present disclosure. Referring to view 801, the panel members 605-*a* may have grooves 610 (also referred to herein as channels) and through holes 615 formed through pattern etching and/or chemical etching in accordance with one or more embodiments of the present disclosure.

In the example operations illustrated at FIGS. 8A through 8E, the operations may be performed in a different order than the order shown, or the operations may be performed in different orders or at different times. Certain operations may also be left out of the operations, one or more operations may be repeated, or other operations may be added.

In accordance with example aspects of the present disclosure, the manufacturing of the coaxial assembly 100 may be implemented without user intervention. For example, the techniques described herein support autonomous manufacturing (e.g., by a system (not illustrated)) of the coaxial assembly 100. The system may autonomously stack and arrange the panel members 605, place and arrange the coaxial cables 130 (e.g., at FIGS. 8B and 8D), dispense epoxy (e.g., in association with forming conductive epoxy layers 120 and bonding the multiple panel members 605), and the like.

In some aspects, the techniques described herein may advantageously manufacture the assembly structure 600 in a single pass. For example, the techniques described herein may include singulating (separating) the coaxial assemblies 100 from the assembly structure 600 in a single pass.

Figure 9:
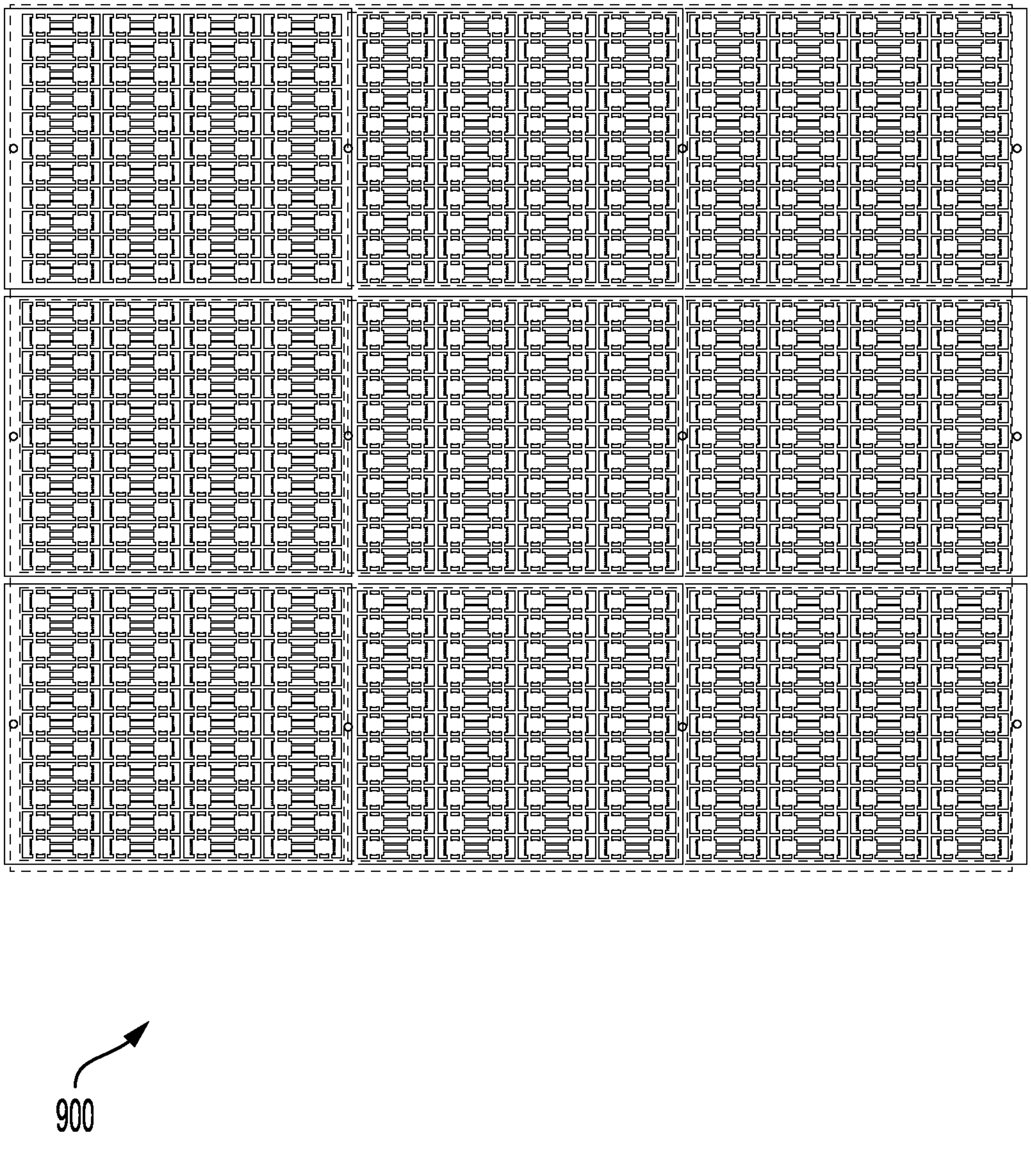
FIG. 9 is a view illustrating a diffusion bond platen size supported by aspects of the present disclosure.
Figure 10A:
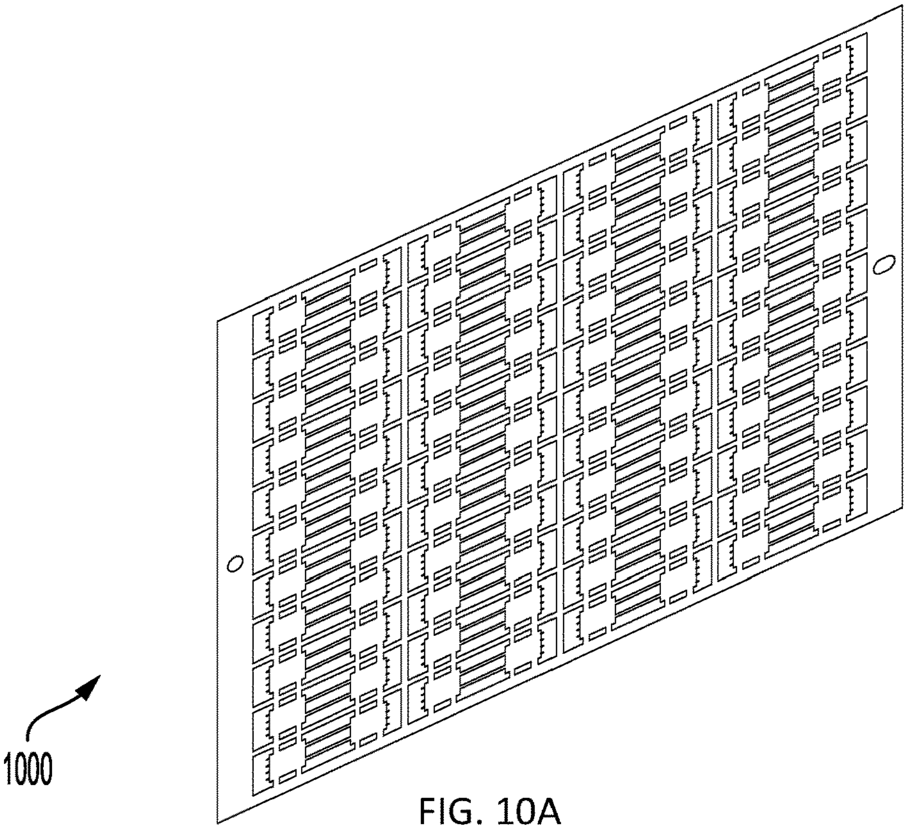
FIGS. 10A and 10B, FIGS. 11A and 11B, and FIGS. 12A and 12B illustrate single layer photo-etched stencils prior to multi-layer bonding in accordance with one or more embodiments of the present disclosure.
Figure 10B:
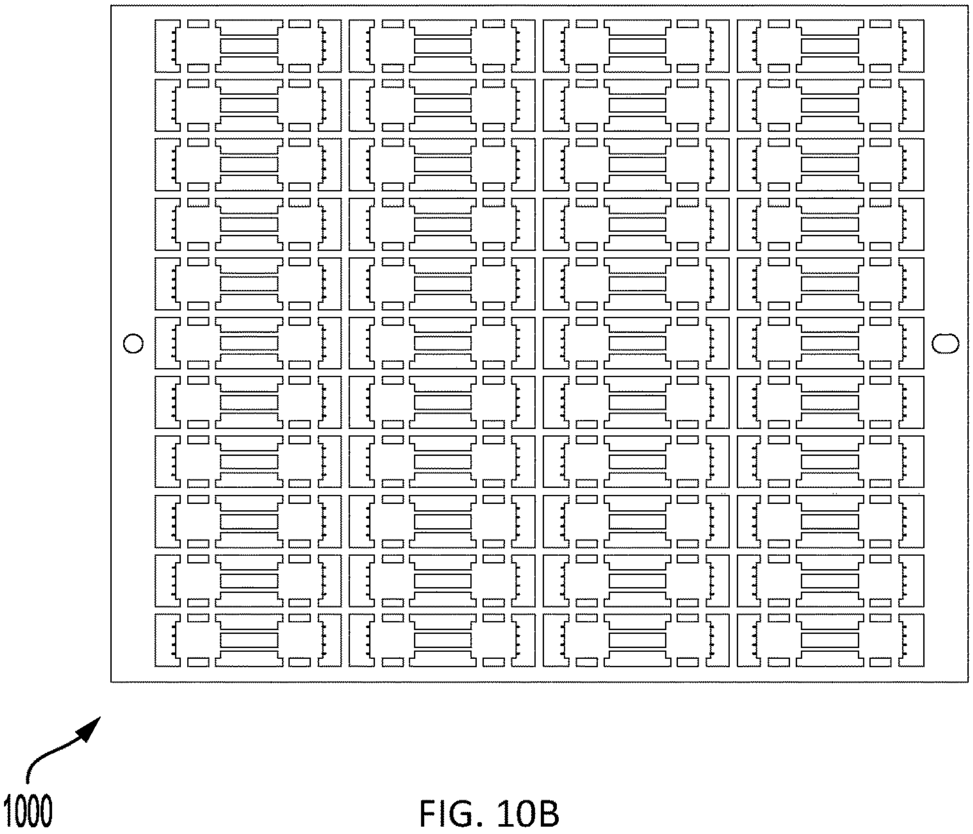
Figure 11A:
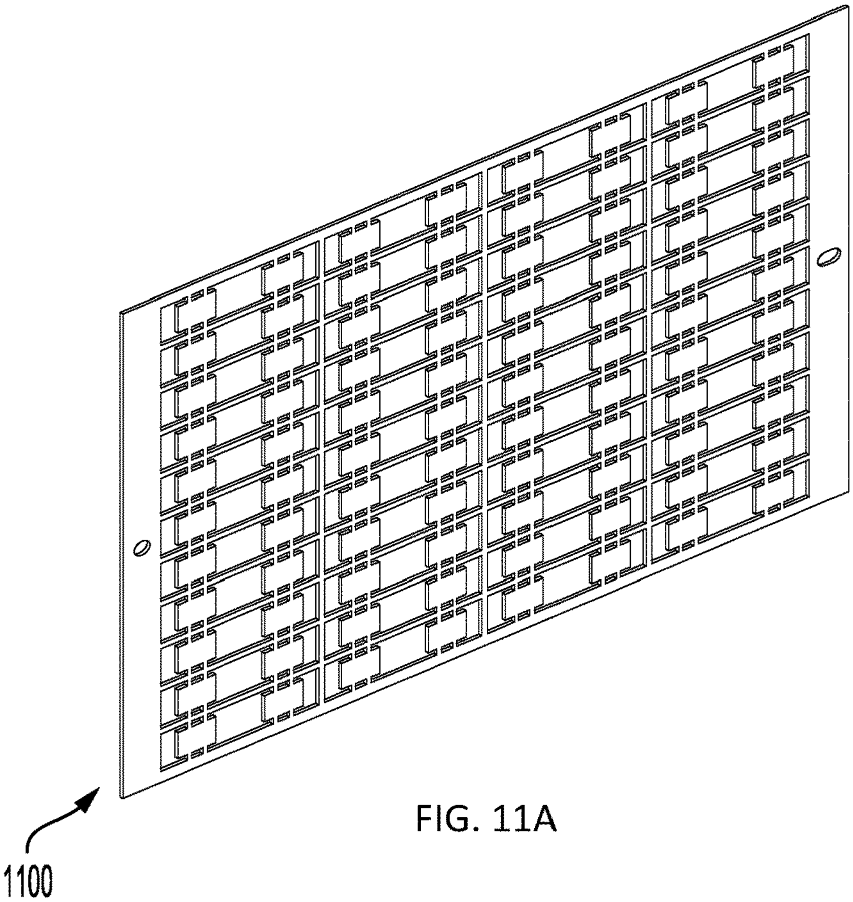
Figure 11B:
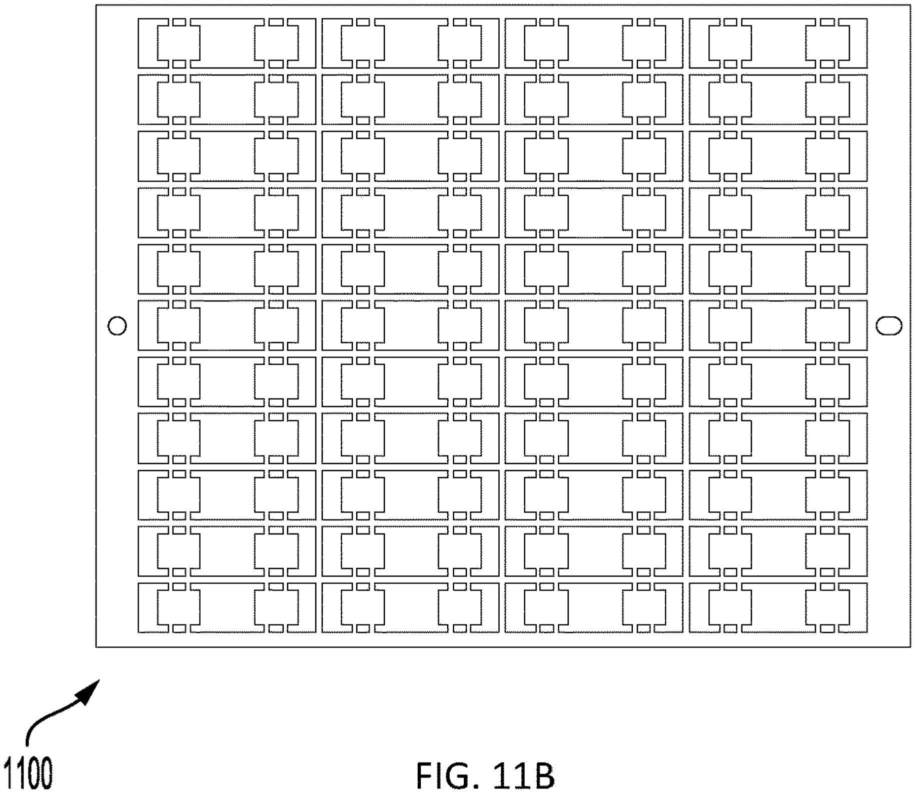
Figure 12A:
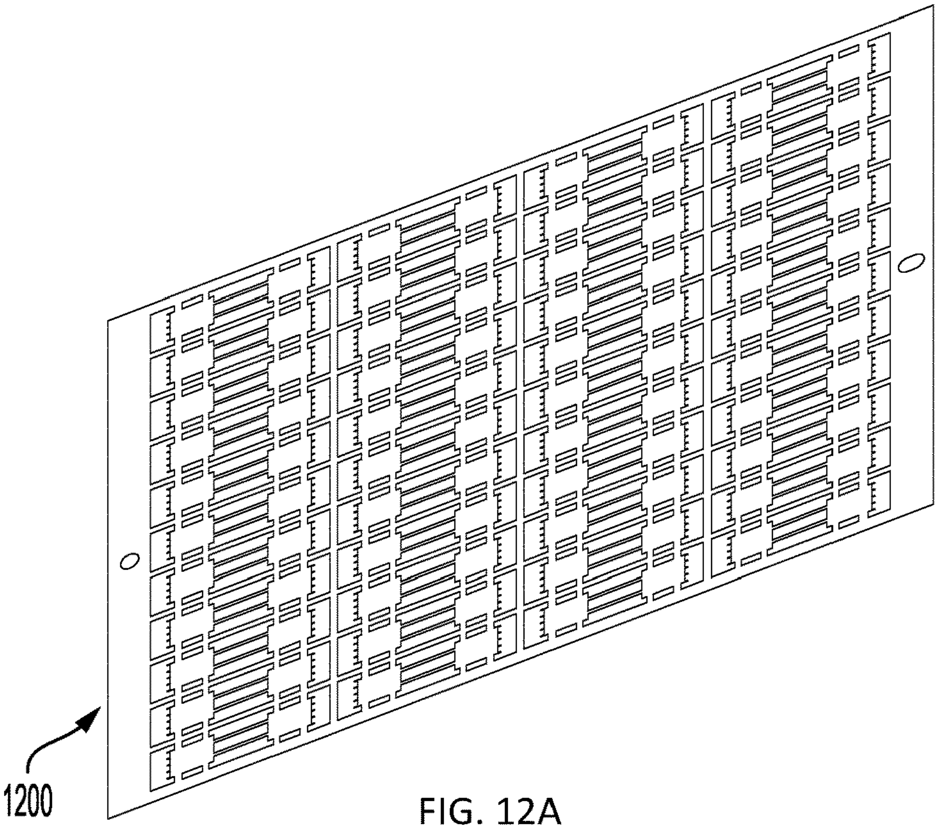
Figure 12B:
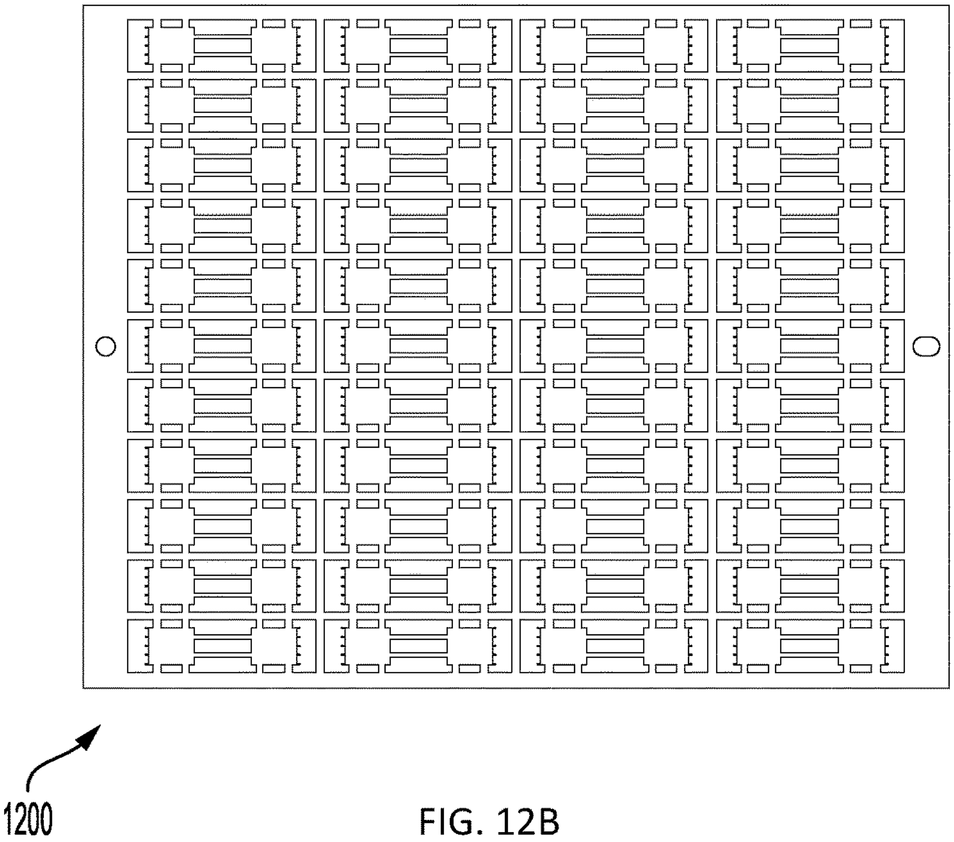

FIG. 9 is a view 900 illustrating aspects of a diffusion bond platen size supported by aspects of the present disclosure. According to one or more embodiments of the present disclosure, the platen may support a 12"×18" max diffusion bond area, a 31×12 max insert array, and a 372 max insert production per bond layer. In an example implementation, based on the platen size, the techniques described herein may yield, for a vertical stack (×4), up to 1488 parts per bond cycle. The example described with reference to FIG. 9 illustrates aspects of a maximized diffusion bond platen size supportive of increased volume. The platen size is not limited to the example described herein. For example, aspects of the present disclosure support any suitable platen size supportive of achieving a target production quantity and manufacturer capabilities.

FIGS. 10A and 10B, FIGS. 11A and 11B, and FIGS. 12A and 12B respectively illustrate example stencil 1000, stencil 1100, and stencil 1200 supportive of manufacturing the coaxial assembly 100 in accordance with one or more alternative embodiments of the present disclosure. Stencil 1000, stencil 1100, and stencil 1200 are examples of single layer photo-etched stencils prior to multi-layer bonding in accordance with one or more embodiments of the present disclosure.

Figure 13A:
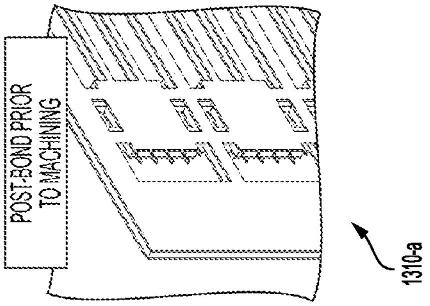
FIGS. 13A through 13F illustrate post-bond machining steps associated in accordance with one or more embodiments of the present disclosure.
Figure 13B:
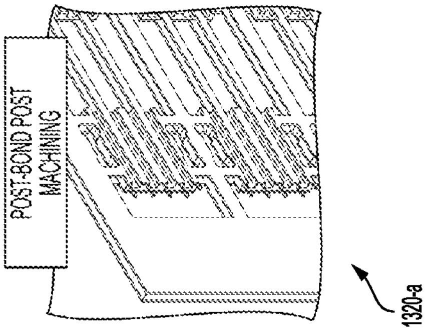
Figure 13C:
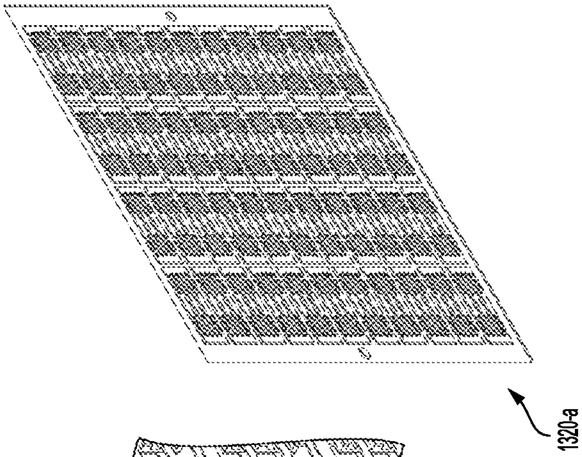

FIGS. 13A through 13F illustrate examples of a panel member as formed using diffusion bonding of multiple metal layers as described herein. For example, FIGS. 13A through 13F illustrate examples of creating coaxial cable channels in accordance with example aspects of the present disclosure. For example, FIG. 13A illustrates an example of the panel member prior to machining (at 1310-*a*), and FIGS. 13B and 13C illustrate examples of the panel member post machining (at 1320-*a*). The panel member illustrated at FIGS. 13A through 13C is an example of a panel member 605-*a* described with reference to FIG. 7.

Figure 13D:
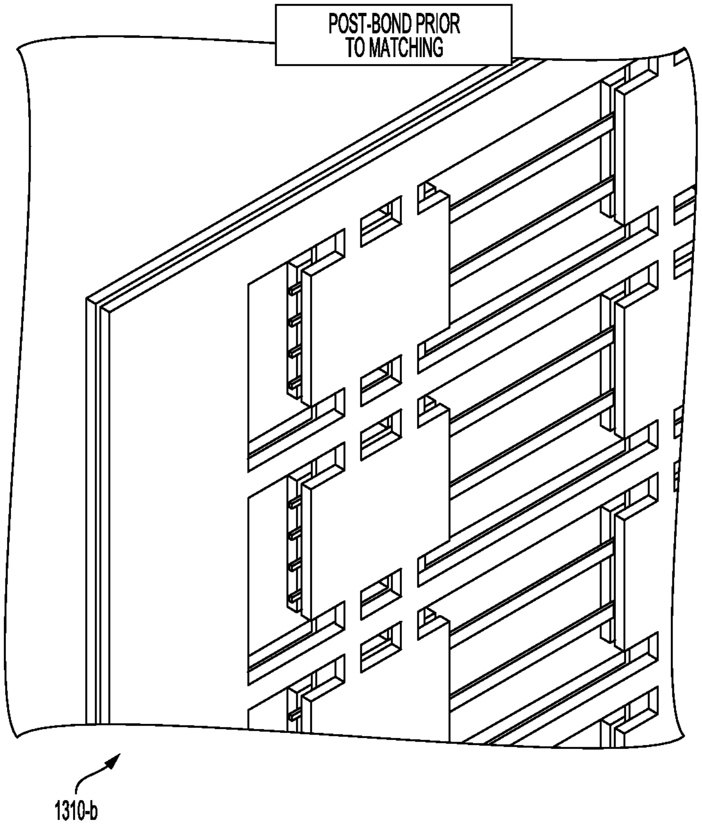
Figure 13E:
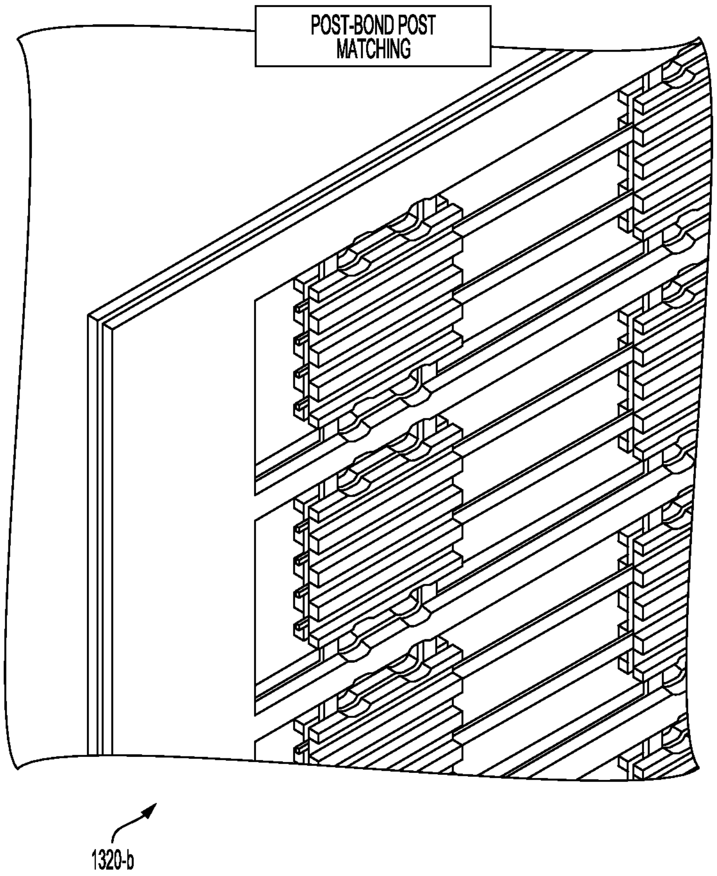
Figure 13F:
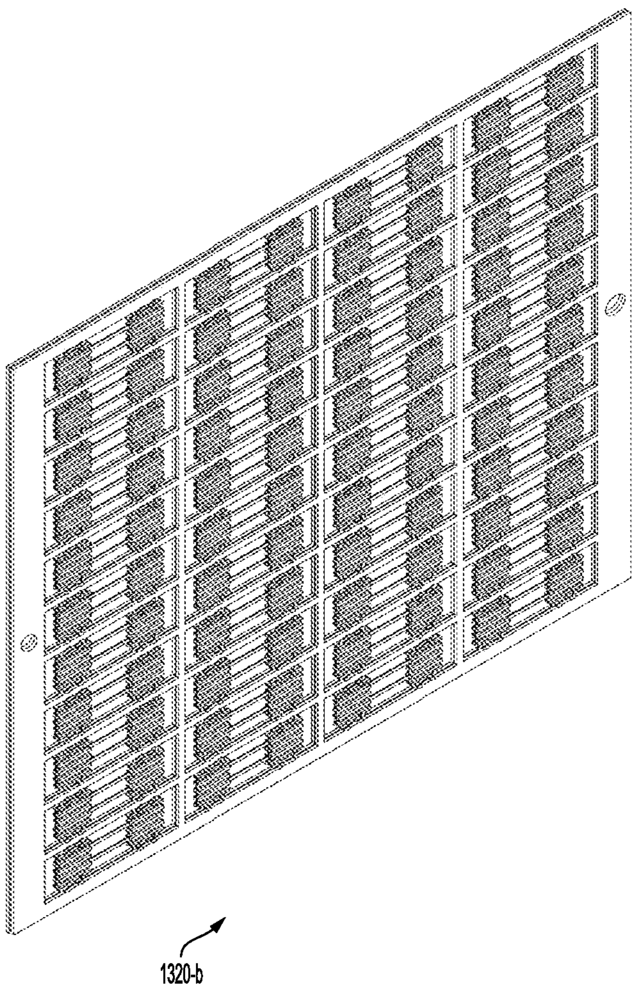

In another example, FIG. 13D illustrates an example of a panel member prior to machining (at 1310-*b*), and FIGS. 13E and 13F illustrate examples of the panel member post machining (at 1320-*b*). The panel member illustrated at FIGS. 13D through 13F is an example of a panel member 605-*b* described with reference to FIG. 7.

Figure 14:
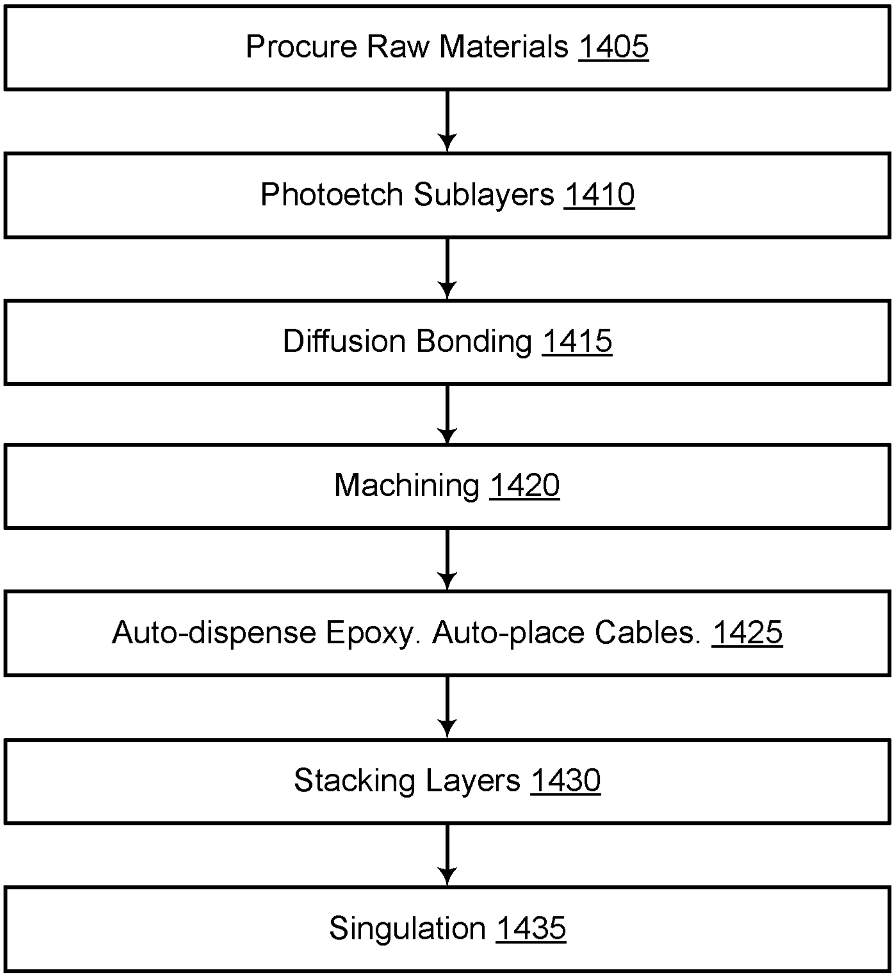
FIG. 14 illustrates an example flowchart of a method in accordance with one or more embodiments of the present disclosure.

FIG. 14 illustrates an example flowchart of a method 1400 (e.g., a fabrication flow) in accordance with one or more embodiments of the present disclosure.

At 1405, the method 1400 includes procuring raw materials.

At 1410, the method 1400 includes photoetching sublayers (e.g., stencils 1000, stencils 1100, stencils 1200) described herein.

At 1415, the method 1400 includes diffusion bonding base layers (e.g., panel members 605-*a*) and union layers (e.g., panel members 605-*b*).

At 1420, the method 1400 includes machining cable channels in bonded base and union layers (e.g., as described with reference to 1320 of FIG. 13).

At 1425, the method 1400 includes auto-dispensing epoxy (e.g., as described with reference to view 801 of FIG. 8) and auto-placing cables (e.g., coaxial cables 130 as described with reference to view 802 of FIG. 8).

At 1430, the method 1400 includes stacking a base layer (e.g., a panel member 605-*a*), a union layer (e.g., a panel member 605-*b*), and a base layer (e.g., another panel member 605-*a*), for example, as described with reference to FIG. 7. In some embodiments, at 1430, the method 1400 includes constraining and curing epoxy. Accordingly, for example, 1430 of the method 1400 may include forming panel assemblies.

At 1435, the method 1400 includes singulating coaxial assemblies 100 from the panel assemblies.

Figure 15:
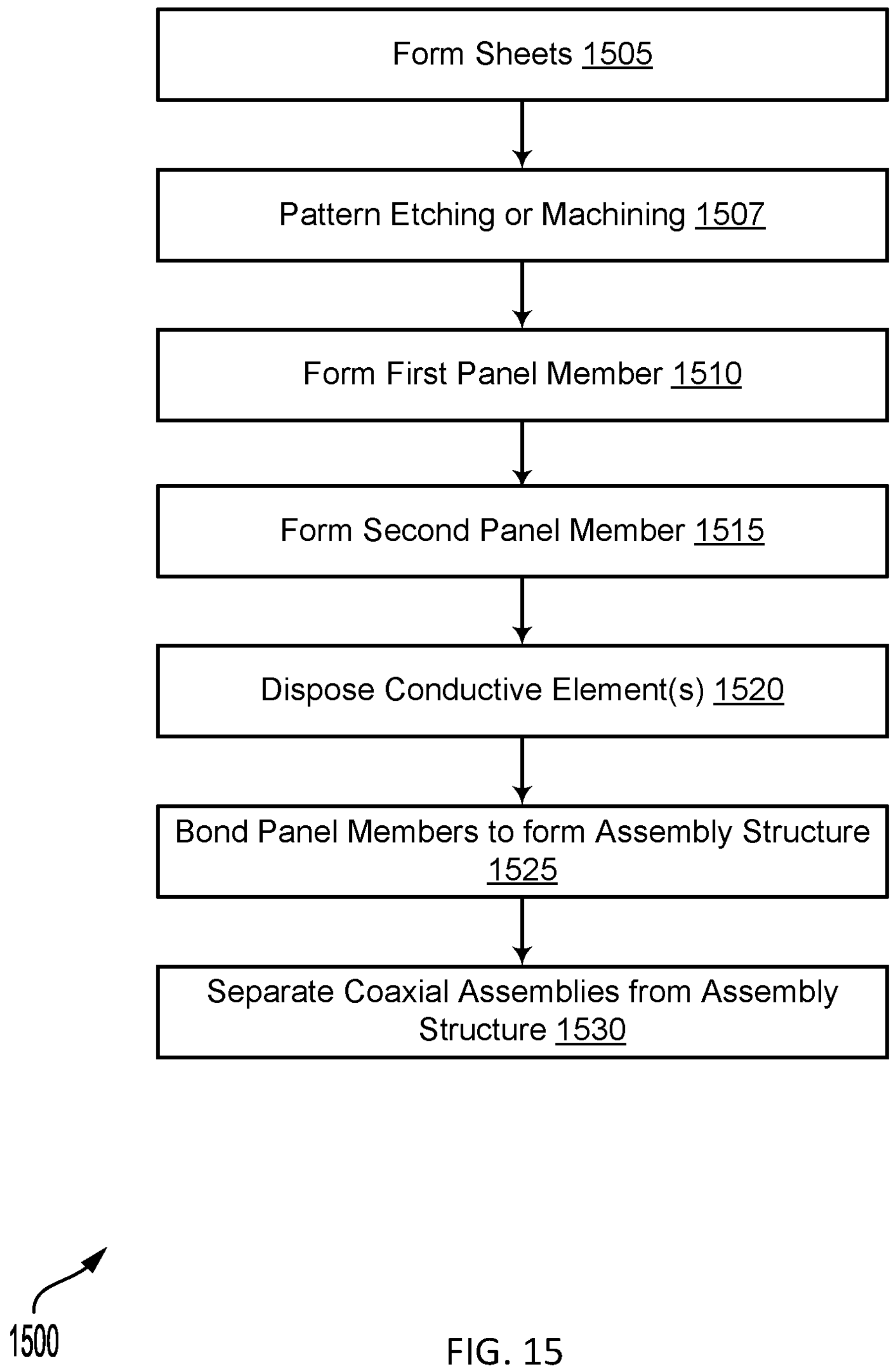
FIG. 15 illustrates an example flowchart of a method in accordance with one or more embodiments of the present disclosure.

FIG. 15 illustrates an example flowchart of a method 1500 of manufacturing one or more coaxial assemblies in accordance with one or more embodiments of the present disclosure.

At 1505, the method 1500 includes forming a plurality of sheets formed of a metal material, the plurality of sheets including at least a first sheet through a fourth sheet.

In some embodiments, at 1505, the method 1500 may include laser cutting the plurality of sheets formed of the metal material, prior to diffusion bonding later described with reference to the method 1500. In some aspects, laser cutting supports <0.001 accuracy.

In some embodiments, at 1505, the method 1500 may include wire electrical discharge machining (EDM) the plurality of sheets formed of the metal material, prior to diffusion bonding later described with reference to the method 1500. In some aspects, wire electrical discharge machining supports about 0.002 to about 0.003 accuracy.

In some embodiments, at 1505, the method 1500 may include water jet fabricating the plurality of sheets formed of the metal material, prior to diffusion bonding later described with reference to the method 1500. In some aspects, water jet fabricating supports about 0.002 to about 0.003 accuracy.

At 1507, the method 1500 includes: pattern etching or machining one or more first features (e.g., first grooves or other features) into the first sheet, the second sheet, or both; and pattern etching or machining one or more second features (e.g., grooves of substantially the same dimensions as the first grooves, other grooves or features) into the third sheet, the fourth sheet, or both. In some aspects, the one or more first features, the one or more second features, or both correspond to a shape of the one or more conductive elements.

At 1510, the method 1500 includes forming a first panel member by diffusion bonding the first sheet formed of the metal material to the second sheet formed of the metal material.

At 1515, the method 1500 includes forming a second panel member by diffusion bonding the third sheet formed of the metal material to the fourth sheet formed of the metal material.

At 1520, the method 1500 includes disposing one or more conductive elements between the first panel member and the second panel member at locations corresponding to the one or more coaxial assemblies, where the one or more conductive elements extend in a longitudinal direction of the one or more coaxial assemblies.

At 1525, the method 1500 includes bonding the first panel member to the second panel member to form an assembly structure including a plurality of coaxial assemblies, where the bonding includes disposing a conductive epoxy or a conductive solder between the first panel member and the second panel member.

At 1530, the method 1500 includes separating the one or more coaxial assemblies from the assembly structure (e.g., singulating the one or more coaxial assemblies).

In some aspects, the manufacturing of the one or more coaxial assemblies is absent user intervention.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the various embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of manufacturing one or more coaxial assemblies, the method comprising:

forming a first panel member by diffusion bonding a first sheet formed of a metal material to a second sheet formed of the metal material;

forming a second panel member by diffusion bonding a third sheet formed of the metal material to a fourth sheet formed of the metal material;

disposing one or more conductive elements between the first panel member and the second panel member at locations corresponding to the one or more coaxial assemblies, wherein the one or more conductive elements extend in a longitudinal direction of the one or more coaxial assemblies;

bonding the first panel member to the second panel member to form an assembly structure comprising a plurality of coaxial assemblies, wherein the bonding comprises disposing a conductive epoxy or a conductive solder between the first panel member and the second panel member; and separating the one or more coaxial assemblies from the assembly structure.

2. The method of claim 1, further comprising:

pattern etching or machining one or more first features into the first sheet, the second sheet, or both; and pattern etching or machining one or more second features into the third sheet, the fourth sheet, or both, wherein the one or more first features, the one or more second features, or both correspond to a shape of the one or more conductive elements.

3. The method of claim 1, wherein the manufacturing of the one or more coaxial assemblies is absent user intervention.

4. The method of claim 1, further comprising:

laser cutting a plurality of sheets formed of the metal material, the plurality of sheets comprising at least the first sheet through the fourth sheet, wherein the laser cutting is prior to the diffusion bonding of the first sheet to the second sheet, the diffusion bonding of the third sheet to the fourth sheet, or both.

5. The method of claim 1, further comprising:

wire electrical discharge machining a plurality of sheets formed of the metal material, the plurality of sheets comprising at least the first sheet through the fourth sheet, wherein the electrical discharge machining is prior to the diffusion bonding of the first sheet to the second sheet, the diffusion bonding of the third sheet to the fourth sheet, or both.

6. The method of claim 1, further comprising:

water jet fabricating a plurality of sheets formed of the metal material, the plurality of sheets comprising at least the first sheet through the fourth sheet, wherein the water jet fabricating is prior to the diffusion bonding of the first sheet to the second sheet, the diffusion bonding of the third sheet to the fourth sheet, or both.

7. An assembly comprising:

a plurality of layers disposed in a stacked arrangement; and one or more conductive elements disposed between adjacent layers of the plurality of layers, wherein the one or more conductive elements extend in a longitudinal direction of the assembly, wherein:

each layer comprises two or more diffusion bonded metal layers; and each layer comprises one or more patterns corresponding to the one or more conductive elements and formed using a chemical etching process.

8. The assembly of claim 7, further comprising:

a conductive epoxy layer disposed between and bonding the adjacent layers of the plurality of layers.

9. The assembly of claim 7, wherein the adjacent layers are diffusion bonded adjacent layers.

10. The assembly of claim 7, wherein each layer of the plurality of layers comprises a set of pins, wherein:

one or more first pins of the set of pins are formed at a first end of the layer; and one or more second pins of the set of pins are formed at a second end of the layer.

11. The assembly of claim 10, wherein each layer of the plurality of layers comprises:

a first quadrangular member;

a second quadrangular member; and one or more elongated members between the first quadrangular member and the second quadrangular member.

12. The assembly of claim 11, wherein:

the one or more first pins are formed at a first end of the first quadrangular member; and the one or more second pins are formed at a first end of the second quadrangular member.

13. The assembly of claim 10, wherein each pin of the set of pins is of a substantially uniform thickness.

14. The assembly of claim 10, wherein each pin of the set of pins is tapered such that:

a width of the one or more first pins decreases in a direction away from a center of the layer; and a width of the one or more second pins decreases in a direction away from the center of the layer.

15. The assembly of claim 7, wherein:

a first end of the one or more conductive elements protrudes outward in a first direction from a first end of the assembly; and a second end of the one or more conductive elements protrudes outward in a second direction opposite the first direction, from a second end of the assembly.

16. The assembly of claim 7, wherein the one or more conductive elements comprise one or more coaxial cables.

17. The assembly of claim 7, wherein the plurality of layers are each of a same thickness.

18. The assembly of claim 7, wherein:

the plurality of layers comprise:

a first layer;

a second layer adjacent to and disposed below the first layer;

a third layer adjacent to and disposed below the second layer; and a plurality of fourth layers associated with meeting end item design specifications; and the one or more conductive elements comprise:

one or more first conductive elements disposed between the first layer and the second layer;

one or more second conductive elements disposed between the second layer and the third layer; and one or more third conductive elements disposed between adjacent fourth layers among the plurality of fourth layers.

19. The assembly of claim 18, wherein the plurality of layers comprise:

a fifth layer disposed between the first layer and the second layer, wherein the fifth layer is disposed at a same level with respect to the one or more first conductive elements;

a sixth layer disposed between the second layer and the third layer, wherein the sixth layer is disposed at a same level with respect to the one or more second conductive elements; and one or more seventh layers disposed at a same level with respect to the one or more third conductive elements.

20. The assembly of claim 7, wherein the two or more diffusion bonded metal layers each comprise stainless steel, a stainless steel alloy, or both.

* * * * *